(12) United States Patent
Kelland et al.

(10) Patent No.: US 6,319,971 B1
(45) Date of Patent: Nov. 20, 2001

(54) COMPOSITION FOR CONTROLLING CLATHRATE HYDRATES AND A METHOD FOR CONTROLLING CLATHRATE HYDRATE FORMATION

(75) Inventors: Malcolm Andrew Kelland, Rçyneberg (NO); Mark Rodger, Coventry (GB); Takashi Namba, Osaka (JP)

(73) Assignees: RF-Procom A/S, Stavanger (NO); Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/424,350

(22) PCT Filed: May 20, 1998

(86) PCT No.: PCT/NO98/00152

§ 371 Date: Feb. 14, 2000

§ 102(e) Date: Feb. 14, 2000

(87) PCT Pub. No.: WO98/53007

PCT Pub. Date: Nov. 26, 1998

(30) Foreign Application Priority Data

May 22, 1997 (NO) .................................................... 972355

(51) Int. Cl.$^7$ .................................................... C08K 5/05
(52) U.S. Cl. ............................................................ 524/379
(58) Field of Search .............................................. 524/379

(56) References Cited

U.S. PATENT DOCUMENTS 5,432,292   7/1995   Sloan, Jr. ............................... 585/15

FOREIGN PATENT DOCUMENTS

| | | |
|---|---|---|
| 2178364 | 12/1996 | (CA) . |
| 93/25798 | 12/1993 | (WO) . |
| 94/12761 | 6/1994 | (WO) . |
| 95/17579 | 6/1995 | (WO) . |
| 96/04462 | 2/1996 | (WO) . |
| 96/08672 | 3/1996 | (WO) . |
| 96/37684 | 11/1996 | (WO) . |
| 96/38492 | 12/1996 | (WO) . |
| 96/41784 | 12/1996 | (WO) . |
| 96/41785 | 12/1996 | (WO) . |
| 96/41786 | 12/1996 | (WO) . |
| 96/41834 | 12/1996 | (WO) . |
| 97/07320 | 2/1997 | (WO) . |

*Primary Examiner*—Edward J. Cain
(74) *Attorney, Agent, or Firm*—Wenderoth, Lind & Ponack, L.L.P.

(57) ABSTRACT

A polymer composition useful for controlling the formation, growth and/or agglomeration of clathrate hydrate comprising two different polymers, designated Polymer x and Polymer y respectively, characterized in that Polymer x is a material whose ln(WBF) is greater than that of Polymer y, which satisfy the following conditions: a) ln(WBF) of x-ln(WBF) of y is greater than 3 and b) the Synergism Index is greater than 0.05.

7 Claims, 1 Drawing Sheet

Figure 1:
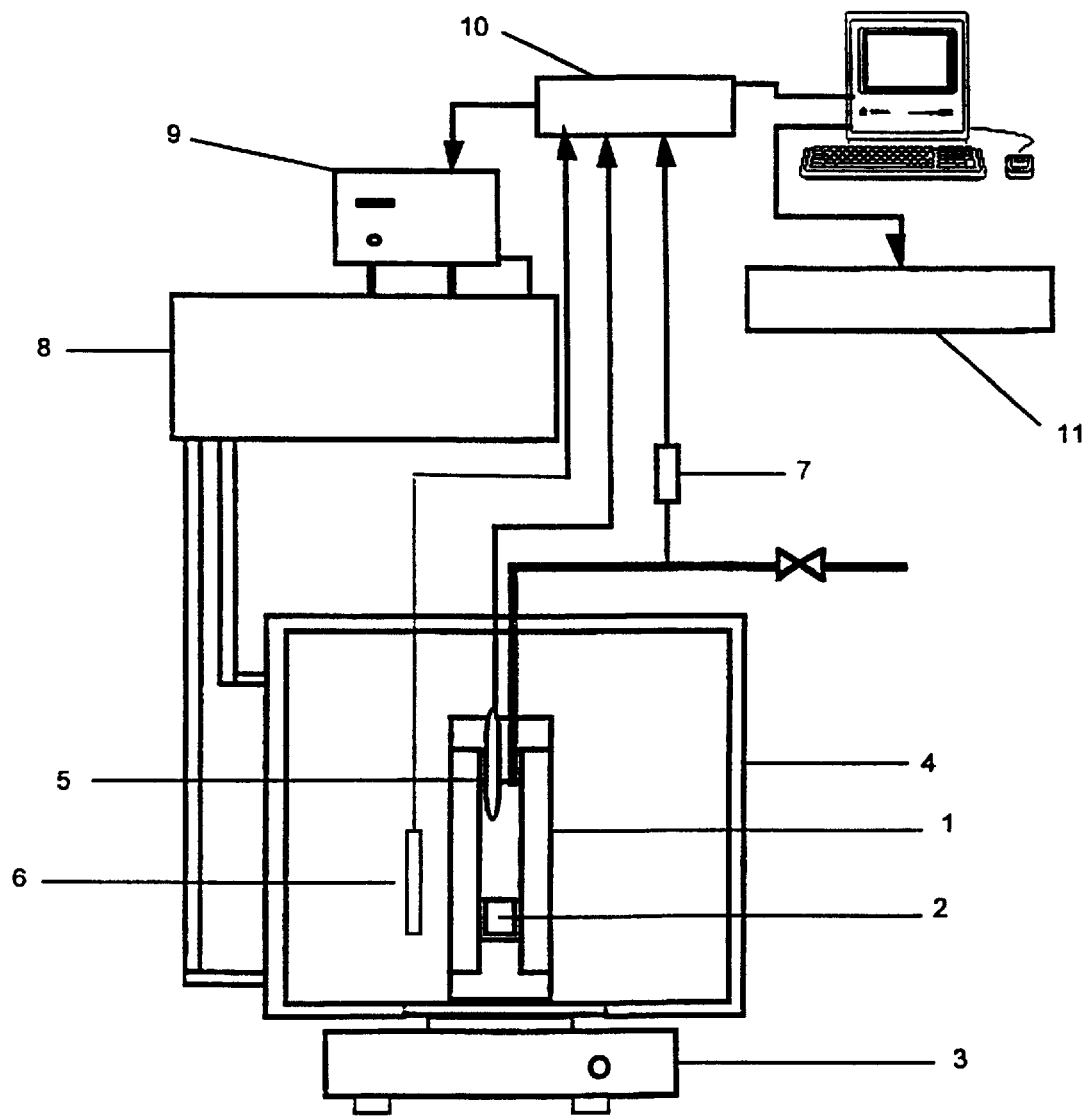

COMPOSITION FOR CONTROLLING CLATHRATE HYDRATES AND A METHOD FOR CONTROLLING CLATHRATE HYDRATE FORMATION

This application is a 371 application of PCT/NO98/00152 filed May 20, 1998.

This invention relates to a composition and a method for inhibiting the formation, agglomeration and plugging by gas hydrates of pipes, wells and equipment containing oil or gas. This is relevant for both drilling and production of oil and gas.

BACKGROUND OF THE INVENTION

Gas hydrates are clathrates (inclusion compounds) of small molecules in a lattice of water molecules. In the petroleum industry natural gas and petroleum fluids contain a variety of these small molecules which can form gas hydrates. They include hydrocarbons such as methane, ethane, propane, iso-butane as well as nitrogen, carbon dioxide and hydrogen sulfide. Larger hydrocarbons such as n-butane, neopentane, ethylene, cyclopentane, cyclohexane, and benzene are also hydrate forming components. When these hydrate forming components are present with water at elevated pressures and reduced temperatures the mixture tends to form gas hydrate crystals. For example, ethane at a pressure of IMPa forms hydrates only below 4° C. whereas at 3 MPa gas hydrates can only form below 14° C. These temperatures and pressures are typical operating environments where petroleum fluids are produced and transported. If gas hydrates are allowed to form inside a pipe or well used to transport natural gas and/or other petroleum fluids they can eventually block the pipe or well. The hydrate blockage can lead to a shutdown in production and significant financial loss. The oil and gas industry uses various means to prevent the formation of hydrate blockages in pipelines and wells. These include heating the pipe, reducing the pressure, removing the water and adding anti-freezes such as methanol and ethylene glycols which act as melting point depressants. Each of these methods is costly to implement and maintain. The most common method used today is adding anti-freezes. However, these anti-freezes have to be added at high concentrations, typically 10–40% by weight of the water present, in order to be effective. Recovery of the anti-freezes is also usually required and a costly procedure. Consequently, there is a need for alternate cheap methods for preventing hydrate blockages in oil and gas drilling and production. An alternative to the above methods is to control the gas hydrate formation process using nucleation and crystal growth inhibitors and/or other chemicals that prevent the formed hydrate crystals from agglomerating. These types of chemicals are widely known and used in other industrial processes. The advantage of using these chemicals to control gas hydrate formation is that they can be used at concentrations of 0.01 to 2% which is much lower than for anti-freezes.

It is an object of this invention to provide a method and composition for controlling gas hydrate formation using additives added at low concentrations to a gas hydrate forming fluid. To prevent gas hydrates from nucleating and growing into crystals, it is possible to design molecules which bind to hydrate surfaces in preference to the bulk water. To do this we need to understand the nature of hydrate surfaces formed during nucleation and crystal growth. It is assumed that Structure II hydrate will preferentially form in pipelines. Methane and ethane on their own form Structure I, but when small amounts of propane or iso-butane hydrocarbons are also present Structure II is the more thermodynamically preferred hydrate. Since $C_{3-4}$ hydrocarbons are always present in natural gas Structure II will always form in preference to Structure I in the field. Further, the concentration of $C_{3-4}$ components is in practice almost always high enough that formation of Structure II is thermodynamically preferred over Structure H in oil and gas pipelines. Structure II hydrate is made up of $5^{12}6^4$ and $5^{12}$ cages. Hydrocarbons which fit the larger Structure II hydrate cages ($5^{12}6^4$) include propane, iso-butane and cyclopentane. These molecules do not need any help gas to form stable Structure II hydrates. Cyclohexane, benzene, n-butane, butadiene, cyclopentene, isobutylene and neopentane represent the larger hydrocarbons that can occupy the large Structure II cavities but they need the use of a help gas in the $5^{12}$ cages, such as methane, to stabilize the structure.

The Structure II hydrate surface is very much dynamic but can be thought of as being made up of open $5^{12}6^4$ and $5^{12}$ cages that would normally be filled with hydrate formers. One way to design a hydrate nucleation or growth inhibitor is to find certain groups which will interact strongly with these open cavities on the surface of the hydrate. Due to the low symmetry of the hydrate structure, the hydrate surface will change as it grows so that at different times the surface will have varying size and shape cavities. Therefore different groups in the same inhibitor molecule or a mixture of different inhibitors with different groups may be more favorable than using just one inhibitor with one interacting group.

It is known that polymers with monomers such as N-vinyl pyrrolidone (Int. Patent Appl. Publ. WO 93/25798), N-vinyl caprolactam (Int. Patent Appl. Publ. WO 94/12761), N-isopropylmethacrylamide (Int. Patent Appl. Publ. WO 96/41 834), and acryloylpyrrolidine (Int. Patent Appl. Publ. WO 96/08672) as well as small molecules such as some alkyl ammonium salts (Int. Patent Appl. Publ. WO 95/17579) are able to slow down the nucleation and growth of Structure II hydrates. Mixtures of a N-vinyl caprolactam polymer and a second N-vinyl pyrrolidone polymer are claimed in Patent Application, Publication WO 96/04462. All the above "known" technologies are not good enough for most field applications, i.e. their performance is not good enough for most applications.

In addition to their insufficient performance as a clathrate hydrate inhibitor, low deposition points of these polymers are also problematic for field applications. This is because the inhibitor must often be injected into a hot well stream e.g. at the well head, where it is required to dissolve in the produced aqueous phase. If the well head temperature is above the deposition temperature of the polymer, the polymer may precipitate out of the hot aqueous solution leading to a restriction or plugging of the injection or production line. Similarly, these clathrate hydrate inhibitor polymers may precipitate out from drilling fluids to which they have been added, especially when the drilling fluid has a high concentration of salts in the aqueous phase and the drilling fluid becomes hot in the well. The deposition point temperature of a water-soluble polymer useful as a clathrate hydrate inhibitor is often hard to measure but often lies 0–20° C. above the cloud point temperature. Thus, a useful indication of the deposition point temperature can be found from the more easily measured cloud point. For example, the cloud point of Gaffix VC-713, terpolymer of vinyl caprolactam, vinyl pyrrolidone, and dimethylaminoethylmethacrylate, is as low as 31° C. in distilled water. Polymers with such low cloud points are rarely applicable for real fields since the deposition point is often lower than the temperature of the produced fluids at the inhibitor injection point, or of the drilling fluids.

It is also claimed in Int. Patent Appl. Publ. WO 96/08672 that alkyl(meth)acrylamides can be used in combination with substantially water-soluble polymers from the group consisting of poly(N-vinyl caprolactam), poly(N-vinyl pyrrolidone) and N-acyl substituted polyalkeneimines. However, the technology is still not good enough since polymers disclosed in the application were prepared by conventional preparation methods so that their molecular weights would be too high to expect the sufficient performance and their deposition points should be too low to be practically used.

It is preferable that a polymer or polymer mixture prevents hydrate nucleation more than crystal growth as this will ensure no build up of hydrate crystals in the hydrate forming system. This is particularly advantageous in gas and oil pipelines as a restriction due to hydrate growth in the pipe can reduce production.

According to the first embodiment of the invention it has been found that Polymer A containing the repeating structural unit (1);

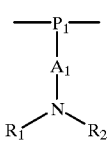

(1)

wherein $P_1$ is an atom on a macromolecular main chain;

$A_1$ is a direct bond or a spacer group, and $R_1$ and $R_2$ are selected from hydrogen; $C_{1-6}$ alkyl; $C_{3-7}$ cycloalkyl;

$C_{1-5}$ alkanoyl; or $R_1$ and $R_2$ together with the nitrogen atom to which they are attached form a $C_{3-7}$ cyclic group, having an extremely low Mn (number average molecular weight) in the range from 400–7000 AND a cloud point for 1 wt % solution in distilled water greater than 50° C. is unexpectedly effective for controlling the formation, growth, and/or agglomeration of clathrate hydrate.

Preferably the Mn of Polymer A is 400–2500, in particular 800–2000.

Polymer A may be used as a mixture of one or some of the following compounds to enhance its performance as a clathrate hydrate inhibitor. They are;

a) a corrosion inhibitor, b) an alcoholic or glycolic solvent c) a mono-, di-, tri- or tetraalkyl ammonium salt or a mono-, di-, or tri-alkylamine oxide, a N-mono-, N,N-di-, or N,N,N-tri-alkylammonium, alkylammonium zwitterion or betaine in which at least one of the alkyl groups has 4–5 carbon atoms.

Some solvents may also behave as synergists and not just as thermodynamic inhibitors or anti-freezes. This applies in particular for alcohols and/or glycols may be used in amount of 0,5–100 wt. part to 1 wt part of the polymer(s). Particular alcohols and glycols are methanol, ethanol, isopropanol, butanol, 2-butoxy ethanol, 2-propoxy ethanol, ethylene glycol and propylene glycol.

Since Polymer A having stronger molecular recognition with a type II hydrate surface is more active, it is preferable that Polymer A contains an N-alkyl(meth)acrylamide or N,N-dialkyl(meth)acrylamide repeating units, more preferably a polymer containing (meth)acryloylpyrrolidine monomer and/or isopropyl(meth)acrylamide.

The total amount of Polymer A that has to be added is generally between 0.05 and 5 wt. %, preferably between 0.1 and 0.5 wt. %, based on the amount of water in the hydrocarbon-containing mixture. The products can be added to a stream of light hydrocarbon and water, or to a drilling fluid, either as powder or preferably in concentrated solution.

The additives can contain other components such as scale inhibitors which do not interfere with the performance of the mixture as a gas hydrate inhibitor.

Polymer(s) A can be homopolymers, or copolymers or terpolymers with other monomers.

In Polymer A containing the general structure (1)

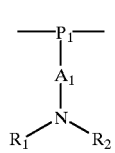

(1)

$P_1$ represents an atom on a macromolecular main chain, which includes substituted and/or unsubstituted hydrocarbon back-bones; polyamide back-bones; polyurethane back-bones; polycarbonate back-bones; polyester back-bones; polyether back-bones; polyimide back-bones, polyalkyleneimine back-bones, etc., to be obtained by chain polymerization, e.g. radical polymerization of ethylenically unsaturated monomers, anionic or cationic polymerization, ring-opening polymerization, etc. or step polymerization, e.g. polycondensation etc. $P_1$ may also be composed of one or more back-bones obtained by the combination of said polymerization techniques and/or reactions among those polymers through functional groups on the polymers or connecting reagents, e.g. polyvalent isocyanates, polyvalent carboxylic acids, etc., after the polymerization.

In the polymer A containing the general structure (1), $A_1$ is either a direct bond (i.e. $P_1$ and the shown nitrogen atom are bonded directly) or $A_1$ represents a spacer group. Preferred spacer groups are a linear or branched $C_{1-24}$ alkylene group optionally carrying one or more substituents selected from halogen atoms and hydroxyl groups; a carbonyl, ester, carbonate, ether, thioester, thioether, amide, urea, urethane or imine group, wherein any NH moiety may be substituted with a $C_{1-2}$ alkyl group; or the spacer group comprises two or more of the above mentioned groups.

More preferably $A_1$ is either a bond (i.e. $P_1$ and the shown nitrogen atom are bonded directly) or $A_1$ contains a carbonyl group bonded directly to the nitrogen atom shown in (1). $A_1$ includes for example the groups —CH2C(=O)— and —C(=O)—. Examples of Polymer(s) A with these groups include polymers of N-vinyl amides, N-alkyl(meth) acrylamides, N,N-dialkyl(meth)acrylamides and N-allyl amides.

In the polymer A containing the general structure (1), $R_1$ and $R_2$ are selected from hydrogen; $C_{1-6}$ alkyl; $C_{3-7}$ cycloalkyl; $C_{1-5}$ alkanoyl; or $R_1$ and $R_2$ together with the nitrogen atom to which they are attached form a $C_{3-7}$ cyclic group. More preferably $R_1$ and $R_2$ together contain a total of 3–5 carbon atoms. Preferred examples include $R_1$=H and $R_2$=isopropyl, $R_1$=H and $R_2$=isobutyl, $R_1$=H and $R_2$=n-propyl, both $R_1$ and $R_2$=ethyl, and where $R_1$ and $R_2$ form a 5-membered ring with the nitrogen atom. More preferably this ring is the pyrrolidine ring. It is preferable that the structure (1) is such that the macromolecular structure is a polymer or copolymer of (meth)acryloylpyrrolidine or N-isopropyl(meth)acrylamide. This can be a homopolymer or structurally part of copolymers with other ethylenically unsaturated monomers including but not limited to alkenes with 2–24 carbons (including isobutylene, styrene, eicosene), (meth)acrylic acid and their salts, maleic anhydride, maleic acid, itaconic acid, crotonic acid and their salts or esters, alkyl (meth)acrylates with 3–26 carbons atoms (including methyl acrylate, n-butyl acrylate, isobutyl acrylate, stearyl acrylate, dimethylaminomethacrylate, methyl methacrylate, isobutyl methacrylate), hydroxyalkylacrylates (including hydroxypropylacrylate and hydroxyethylacrylate), vinyl carboxylates (including vinyl acetate), alkyl vinyl ethers (including isobutyl vinyl ether, isopropyl vinylether, methylvinylether, ethyl vinylether, propyl vinylether and butyl vinylether), N-vinyl lactams, (including N-vinyl caprolactam, N-vinyl piperidone or N-vinyl pyrrolidone), N-vinyl amides (including N-vinyl-N-methyl acetamide, N-vinyl acetamide and N-vinyl formamide), and other hydrophilic monomers (including vinyloxazolidone, isopropenyloxazoline, (meth)acrylamide, N-methyl(meth)acrylamide, N, N-dimethyl(meth)acrylamide, dimethylaminoethyl(meth)acrylate, N-ethylacrylamide and their salts, dimethylaminopropyl (meth)acrylamide and their salts, (meth)acrylamido-2-methylpropane sulfonic acid and their salts, sulfoethyl (meth)acrylate and their salts, styrene sulfonic acid and its salt, hydroxyallyoxypropanesulfonic acid and its salt, 2-hydroxy-3-butenesulfonic acid and its salt, vinyl sulfonic acid and its salts, vinyl phosphonic acid and its salt).

In a preferred embodiment the polymer A contains the structural unit (1) as a part of a larger structural unit (2)

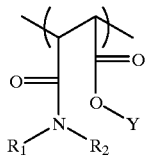

(2)

in which $R_1$ and $R_2$ together with the nitrogen atom form a $C_{3-7}$ cyclic group, more preferably $R_1$ and $R_2$ form a 5-membered ring with the nitrogen atom, i.e. $C_4$ to form a pyrrolidine ring. In a smaller number of

groups, $R_1$ may be H or $C_{1-5}$ alkyl, hydroxyalkyl or aminoalkyl, and $R_2$ is $C_{1-5}$ alkyl, hydroxyalkyl or aminoalkyl.

Y is hydrogen, an alkyl group with 1–24 carbon atoms, or a group which can be ionized to form a cation. Preferably the cation, Y', can be a metal cation or a molecule with a quaternary ammonium ion. Polymers containing the structural unit (2) are preferably made by reacting one or more amines, in which at least one of the amines is a cyclic amine with 3–7 carbons, with a polymer or copolymer of maleic anhydride. More preferably the cyclic amine is pyrrolidine. Alternatively, the polymer containing the structural unit (2) is made by reacting maleic anhydride with one or more amines, in which at least one of the amines is a cyclic amine with 3–7 carbons, followed by polymerization of the amidified monomer(s) with or without other comonomers. The maleic anhydride polymer, used to make polymers with structure unit (2), is either a homopolymer or preferably a copolymer with other ethylenically unsaturated monomers. Examples include but are not limited to alkenes with 2–24 carbons (including isobutylene, styrene, eicosene), (meth) acrylic acid and their salts, maleic anhydride, maleic acid, itaconic acid, crotonic acid and their salts or esters, alkyl (meth)acrylates with 3–26 carbons atoms (including methyl acrylate, n-butyl acrylate, isobutyl acrylate, stearyl acrylate, dimethylaminomethacrylate, methyl methacrylate, isobutyl methacrylate), hydroxyalkylacrylates (including hydroxypropylacrylate and hydroxyethylacrylate), vinyl carboxylates (including vinyl acetate), alkyl vinyl ethers (including isobutyl vinyl ether, isopropyl vinylether, methylvinylether, ethyl vinylether, propyl vinylether and butyl vinylether), N-vinyl lactams, (including N-vinyl caprolactam, N-vinyl piperidone or N-vinyl pyrrolidone), N-vinyl amides (including N-vinyl-N-methyl acetamide, N-vinyl acetamide and N-vinyl formamide), and other hydrophilic monomers (including vinyloxazolidone, isopropenyloxazoline, (meth) acrylamide, N-methyl(meth)acrylamide, N, N-dimethyl (meth)acrylamide, dimethylaminoethyl(meth)acrylate, N-ethylacrylamide and their salts, dimethylaminopropyl (meth)acrylamide and their salts, (meth)acrylamido-2-methylpropane sulfonic acid and their salts, sulfoethyl (meth)acrylate and their salts, styrene sulfonic acid and its salt, hydroxyallyoxypropanesulfonic acid and its salt, 2-hydroxy-3-butenesulfonic acid and its salt, vinyl sulfonic acid and its salts, vinyl phosphonic acid and its salt).

Examples of other non-cyclic amines that can be reacted with the maleic anhydride polymer together with the cyclic amine include alkylamines or hydroxyamines with 1 to 5 carbon atoms. Examples of alkylamines are methylamine, dimethylamine, ethylamine, diethylamine, n-propylamine, iso-propylamine, iso-butylamine, n-butylamine, dimethylaminopropylamine, dimethylaminoethylamine. Examples of hydroxyamines include 2-amino-2-methyl-1-propanol, 2-aminoethanol, 2-(2-aminoethylamino)ethanol, 2-(2-aminoethoxy)ethanol and 1-amino-2-propanol as well as polyglycols of ethylene oxide, propylene oxide and butylene oxide with one amine end group.

It is also essential for Polymer A to have a molecular weight in the range from 400–7000 AND a cloud point for 1 wt % solution in distilled water greater than 50° C.

Polymer A which satisfies all the above requirements may be prepared by polymerizing monomers by the well-established radical, anion, or cation polymerization methods. However, it is also found by the persons skilled in the art that obtaining polymers containing the structural units (1) and having cloud points as high as the present invention is often difficult by such conventional preparation methods. Preferred Preparation Methods to Obtain Polymer A are;

(I) Reacting compounds which can be transformed to the respective monomers of the structural units (1) or (2), and obtain Polymer A by in situ polymerization. For example, the products derived by reacting ethylenically unsaturated double bonds of the respective monomers with water, alcohols, mercaptans, or amines are transformed back to the original monomers and simultaneously polymerized by in situ polymerization.

(II) Reacting polymers such as polyacrylates with amines which give the respective polymers containing the structural units (1) or (2).

(III) Polymerizing the respective monomers of the structural units (1) or (2) in very low concentration.

(IV) Polymerizing the respective monomers of the structural units (1) or (2) in the presence of chain transfer reagents such as mercaptans or alcohols.

(V) Polymerizing the respective monomers of the structural units (1) or (2) in the poor solvent system for Polymer A and letting Polymer A precipitate out from the system before the molecular weight reaches higher than the range of the present application.

According to the second embodiment of the invention, it has been found that there is unexpected synergism between Polymers x and y for controlling the formation, growth and/or agglomeration of clathrate hydrate when Polymers x and y are added to a hydrate forming fluid and when both conditions a) and b) are satisfied. Conditions c) and d) are optional but preferred. They are:

Polymers x and Polymers y are materials which satisfy the following conditions (Polymers x being defined as the material whose In(WBF) is greater than that of the other one, which is Polymer y):

a) In(WFB) of x-In(WFB) of y is greater than 3, and b) the Synergism Index, defined by the following equation, is greater than 0.05:

$$I_{(x,y)} = \frac{\{\ln(WBF_{(x)})/Dp_{(x)}^{0.5}\} \cdot Ph_{(x)} \cdot C_{(x)}^2}{\{\ln(WBF_{(y)})/Dp_{(y)}^{0.5}\} \cdot Ph_{(y)} \cdot C_{(y)}^2}$$

where $I_{(x,y)}$ is the parameter $Dp_{(I)}$ is the degree of polymerization of the Polymer I $Ph_{(i)}$ is the hydrophilicity factor of Polymer I defined by the following equation:

$$Ph = \frac{bp_{(H2O) at 760mmHg}[K.]}{Tcloud[K.]}$$

where $bP_{(H2O)}$ is the boiling point of water in K $T_{cloud}$ is the cloud point in 1 wt % solution in distilled water of a polymer of a structure corresponding to either Polymers x or y when its molecular weight is over 10,000, $C_{(I)}$ is the concentration of the Polymer I, where I is x or y c) $I_{(x,y)}$ is more preferably greater than 0.1.

It is more preferable that the Polymers x satisfies the condition d) in addition to the conditions a) and b).

d) In(WBF) of Polymers x is more preferably greater than −5.

In (WBF) can be calculated by molecular modelling disclosed in references:

T. J. Carver, M. G. B. Drew & P. M. Rodger, *J. Chem Soc., Faraday Trans.*, 91, 3449, 1995; and T. J. Carver, M. G. B. Drew & P. M. Rodger, *J. Chem Soc., Faraday Trans.*, 92, 5092, 1996.

The Synergism Index of the present invention is the product created by considering the contribution of factors which should be dominant on gas hydrate inhibition by a multi-component system.

Upon calculating Dp(i) in the Synergism Index equation, the weight average molecular weight, Mw, is conveniently used and Dp(i) can be calculated dividing Mw by the formula weight of the repeating unit of the polymer. As it is well understood for those skilled in the art, a polymer is usually comprised of molecules having various molecular weights. There are two kinds of average molecular weights, number average molecular weight, Mn, and weight average molecular weight, Mw, very commonly used to discuss the influences of such a molecular weight distribution on various features of polymer containing systems.

Dp(i) is the parameter included for taking the influence of the mobility of polymer molecules in a system (solution) in to account, and in the case concerning the mobility of polymer molecules in a solution, Mw is regarded as a more important factor than Mn.

Mn, on the other hand, becomes dominant once polymer molecules are adsorbed on the gas hydrate surface since Mn is connected to the size of the molecule and so, it is related to the area and thickness on the surface covered by the polymer molecules. Thus, the efficiency of each component as a gas hydrate inhibitor is believed to be closely related to Mn.

WBF, the weight Boltzmann factor, is essentially the canonical partition function for adsorption on the hydrate surface for a substrate. Thus, In(WBF) is related to the free energy of adsorption.

The total amount of Polymers x and y that has to be added is generally between 0.05 and 5 wt. %, preferably between 0.1 and 0.5 wt. %, based on the amount of water in the hydrocarbon-containing mixture. The products can be added to a stream of light hydrocarbon and water, or to a drilling fluid, either as powder or preferably in concentrated solution.

Adsorption takes place when the material has some affinity to the substrate (gas hydrate) and it is believed that higher affinity and lower adsorption energy give stronger and more stable adsorption. Since In(WBF) is related to the affinity and adsorption energy of a material, it is understood that a material having a higher In(WBF) adsorbs more strongly and more stable than one having In(WBF) when other conditions are the same. Since "adsorption" is a process having an equilibrium where adsorption and desorption is balanced, when two kinds of materials are present, they compete for the available adsorption sites. In order to evaluate an adsorption state of a two or more component system, the tendency of materials to move from the surroundings (water phase) to the substrate (gas hydrate) should be considered; the molecular weight and the hydrophobicity of the materials are recognized as two important factors for this. The molecular weights of the materials conveniently measured by gel-permeation chromatography. Tcl of a polymer having the corresponding structure and the molecular weight of over 10,000 can be the indication of the hydrophobicity of a material since Tcl of a polymer is usually independent when the molecular weight is over 10,000 but it varies as the molecular weight decreases below that. In addition, the concentration is also important since a higher concentration increases the probability of the material to interact with an adsorption site.

According to the third embodiment of the present invention we provide a composition for controlling the formation, growth and/or agglomeration of clathrate hydrates which is one of the preferable modes within the second embodiment of the present invention. Said composition comprises polymer x selected from Polymer A' containing the repeating structural unit (1') and Polymer y selected from Polymer B containing the repeating structural unit (3).

Polymer A' contains the repeating structural unit (1')

(1')

wherein $P_1$ is an atom on a macromolecular main chain;

$A_1$ is a direct bond or a spacer group, and $R_1$ and $R_2$ are selected from hydrogen; $C_{1-6}$ alkyl; $C_{3-7}$ cycloalkyl;

$C_{1-5}$ alkanoyl; or $R_1$ and $R_2$ together with the nitrogen atom to which they are attached form a $C_{3-7}$ cyclic group, and Polymer B which is present in an amount not higher than that of Polymer A', contains the repeating structural unit (3)

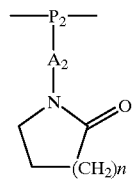

(3)

wherein $P_2$ is an atom on a macromolecular main chain;

$A_2$ is a direct bond or a spacer group; and n is an integer from 1 to 3.

The composition optionally comprises a corrosion inhibitor, an alcoholic solvent or a glycol solvent and/or a mono-, di-, tri- or tetraalkyl ammonium salt, a mono-, di- or tri-alkylamide oxide, ammonium zwitterion or a betaine in which at least one of the alkyl groups has 4–5 carbon atoms.

Some solvents may also behave as synergists and not just as thermodynamic inhibitors or anti-freezes. This applies in particular for alcohols and/or glycols which may be used in amounts of 0,5–100 wt. part to 1 wt part of the polymer(s). Particular alcohols and glycols are methanol, ethanol, isopropanol, butanol, 2-butoxy ethanol, 2-propoxy ethanol, ethylene glycol and propylene glycol.

There is expected to be a synergistic effect of adding to Polymer(s) A' (such as AP-1000 5k, IP-1010DA-12, or IP-1010ASN-26) one or more Polymer(s) B (containing either or both pendant caprolactam or pyrrolidone groups). This mixture has a higher hydrate inhibition performance than the simple addition product of the performance of Polymer(s) A' and Polymer B. Thus, addition of a Polymer B with pendant pyrrolidone group to Polymer(s) A' is predicted to inhibit hydrate formation to a greater degree than Polymer(s) A' alone. Addition of a Polymer B with pendant caprolactam groups to Polymer(s) A' is predicted to inhibit the hydrate formation to a greater degree than Polymer(s) A' alone. Addition of a mixture of two Polymers B, one with pendant pyrrolidone groups and one with pendant caprolactam groups is expected to be more active at inhibiting hydrate nucleation and crystal growth than addition of a single Polymer B to Polymer(s) A'.

Moreover, since Polymer(s) A' (examples represented by AP-1000 5k, IP-1010DA-12, or IP-1010ASN-26) gives strongest molecular recognition with a type II hydrate surface, the greater synergism will be seen when Polymer(s) A' adsorbs on the surface of hydrate nuclei and crystals faster and stronger than any Polymer B. Therefore it is preferable that, a) the amount of Polymer(s) A' added is greater than the amount of Polymer(s) B b) the molecular weight of Polymer(s) A' is less than 20,000 as this gives greatest mobility in solution for Polymer(s) A'. Preferably the Mn of Polymer(s) A' is in the range 500 to 10,000.

The addition of both a Polymer B with pendant pyrrolidone groups and a second Polymer B with pendant caprolactam groups to Polymer(s) A' gives a mixture that is more active at inhibiting hydrate formation than addition of only one of these Polymer(s) B to Polymer(s) A'. Further, addition of a copolymer B with both pendant pyrrolidone and caprolactam groups to Polymer(s) A' gives better performance than addition of a Polymer B with only one of the two pendant groups to Polymer(s) A'.

The effect of the mixture is to inhibit the nucleation, crystal growth and/or agglomeration and deposition of gas hydrate crystals in a gas hydrate forming fluid.

The polymer mixture can optionally be used with one or more of the following:

a corrosion inhibitor an alcohol or glycol solvent an alkylammonium salt, alkyl amine oxide, ammonium zwitterion or betaine where at least one of the alkyl groups has 4–5 carbon atoms.

The mixture of additives can contain other compounds such as scale inhibitors which do not interfere with the performance of the mixture as a gas hydrate inhibitor. Polymer(s) A' and B can be homopolymers, or copolymers or terpolymers with other monomers.

In Polymer(s) A' containing the general structure (1')

(1')

$P_1$ represents an atom on a macromolecular main chain, which includes substituted and/or unsubstituted hydrocarbon back-bones; polyamide back-bones; polyurethane back-bones; polycarbonate back-bones; polyester back-bones; polyether back-bones; polyimide back-bones, polyalkylene-imine back-bones, etc., to be obtained by chain polymerization, e.g. radical polymerization of ethylenically unsaturated monomers, anionic or cationic polymerization, ring-opening polymerization, etc. or step polymerization, e.g. polycondensation etc. $P_1$ may also be composed of one or more back-bones obtained by the combination of said polymerization techniques and/or reactions among those polymers through functional groups on the polymers or connecting reagents, e.g. polyvalent isocyanates, polyvalent carboxylic acids, etc., after the polymerization.

In Polymer(s) A' containing the general structure (1), $A_1$ is either a direct bond (i.e. $P_1$ and the shown nitrogen atom are bonded directly) or $A_1$ represents a spacer group. Preferred spacer groups are a linear or branched $C_{1-24}$ alkylene group optionally carrying one or more substituents selected from halogen atoms and hydroxyl groups; a carbonyl, ester, carbonate, ether, thioester, thioether, amide, urea, urethane or imine group, wherein any NH moiety may be substituted with a $C_{1-2}$ alkyl group; or the spacer group comprises two or more of the above mentioned groups.

More preferably $A_1$ is either a bond (i.e. $P_1$ and the shown nitrogen atom are bonded directly) or $A_1$ contains a carbonyl group bonded directly to the nitrogen atom shown in (1). $A_1$ includes for example the groups —$CH_2C(=O)$— and —$C(=O)$—. Examples of Polymer(s) A with these groups include polymers of N-vinyl amides, N-alkyl(meth) acrylamides, N,N-dialkyl(meth)acrylamides and N-allyl amides.

In Polymer(s) A' containing the general structure (1), $R_1$ and $R_2$ are selected from hydrogen; $C_{1-6}$ alkyl; $C_{3-7}$ cycloalkyl; $C_{1-5}$ alkanoyl; or $R_1$ and $R_2$ together with the nitrogen atom to which they are attached form a $C_{3-7}$ cyclic group. More preferably $R_1$ and $R_2$ together contain a total of 3–5 carbon atoms. Preferred examples include $R_1$=H and $R_2$=isopropyl, $R_1$=H and $R_2$=isobutyl, $R_1$=H and $R_2$=n-propyl, both $R_1$ and $R_2$=ethyl, and where $R_1$ and $R_2$ form a 5-membered ring with the nitrogen atom. More preferably this ring is the pyrrolidine ring. It is preferable that the structure (1) is such that the macromolecular structure is a polymer or copolymer of (meth)acryloylpyrrolidine. This can be a homopolymer or structurally part of copolymers with other ethylenically unsaturated monomers including but not limited to alkenes with 2–24 carbons (including isobutylene, styrene, eicosene), (meth)acrylic acid and their salts, maleic anhydride, maleic acid, itaconic acid, crotonic acid and their salts or esters, alkyl (meth)acrylates with 3–26 carbons atoms (including methyl acrylate, n-butyl acrylate, isobutyl acrylate, stearyl acrylate, dimethylaminomethacrylate, methyl methacrylate, isobutyl methacrylate), hydroxyalkylacrylates (including hydroxypropylacrylate and hydroxyethylacrylate), vinyl carboxylates (including vinyl acetate), alkyl vinyl ethers (including isobutyl vinyl ether, isopropyl vinylether, methylvinylether, ethyl vinylether, propyl vinylether and butyl vinylether), N-vinyl lactams, (including N-vinyl caprolactam, N-vinyl piperidone or N-vinyl pyrrolidone), N-vinyl amides (including N-vinyl-N-methyl acetamide, N-vinyl acetamide and N-vinyl formamide), and other hydrophilic monomers (including vinyloxazolidone, isopropenyloxazoline, (meth)acrylamide, N-methyl(meth)acrylamide, N, N-dimethyl (meth)acrylamide, dimethylaminoethyl(meth)acrylate, N-ethylacrylamide and their salts, dimethylaminopropyl (meth)acrylamide and their salts, (meth)acrylamido-2-methylpropane sulfonic acid and their salts, sulfoethyl (meth)acrylate and their salts, styrene sulfonic acid and its salt, hydroxyallyoxypropanesulfonic acid and its salt, 2-hydroxy-3-butenesulfonic acid and its salt, vinyl sulfonic acid and its salts, vinyl phosphonic acid and its salt).

In a preferred embodiment Polymer(s) A' contain the structural unit (1') as a part of a larger structural unit (2')

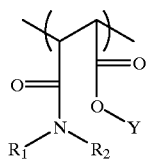

(2')

in which $R_1$ and $R_2$ together with the nitrogen atom form a $C_{3-7}$ cyclic group, more preferably $R_1$ and $R_2$ form a 5-membered ring with the nitrogen atom, i.e. $C_4$ to form a pyrrolidine ring. In a smaller number of

groups, $R_1$ may be H or $C_{1-5}$ alkyl, hydroxyalkyl or aminoalkyl, and $R_2$ is $C_{1-5}$ alkyl, hydroxyalkyl or aminoalkyl.

Y is hydrogen, an alkyl group with 1–24 carbon atoms, or a group which can be ionized to form a cation. Preferably the cation, Y', can be a metal cation or a molecule with a quaternary ammonium ion. Polymers containing the structural unit (2') are preferably made by reacting one or more amines, in which is at least one of the amines is a cyclic amine with 3–7 carbons, with a polymer or copolymer of maleic anhydride. More preferably the cyclic amine is pyrrolidine. Alternatively, the polymer containing the structural unit (2') is made by reacting maleic anhydride with one or more amines, in which at least one of the amines is a cyclic amine with 3–7 carbons, followed by polymerization of the amidified monomer(s) with or without other comonomers. The maleic anhydride polymer, used to make polymers with structure unit (2'), is either a homopolymer or preferably a copolymer with other ethylenically unsaturated monomers. Examples include but are not limited to alkenes with 2–24 carbons (including isobutylene, styrene, eicosene), (meth)acrylic acid and their salts, maleic anhydride, maleic acid, itaconic acid, crotonic acid and their salts or esters, alkyl (meth)acrylates with 3–26 carbons atoms (including methyl acrylate, n-butyl acrylate, isobutyl acrylate, stearyl acrylate, dimethylaminomethacrylate, methyl methacrylate, isobutyl methacrylate), hydroxyalkylacrylates (including hydroxypropylacrylate and hydroxyethylacrylate), vinyl carboxylates (including vinyl acetate), alkyl vinyl ethers (including isobutyl vinyl ether, isopropyl vinylether, methylvinylether, ethyl vinylether, propyl vinylether and butyl vinylether), N-vinyl lactams, (including N-vinyl caprolactam, N-vinyl piperidone or N-vinyl pyrrolidone), N-vinyl amides (including N-vinyl-N-methyl acetamide, N-vinyl acetamide and N-vinyl formamide), and other hydrophilic monomers (including vinyloxazolidone, isopropenyloxazoline, (meth)acrylamide, N-methyl(meth)acrylamide, N, N-dimethyl(meth) acrylamide, dimethylaminoethyl(meth)acrylate, N-ethylacrylamide and their salts, dimethylaminopropyl (meth)acrylamide and their salts, (meth)acrylamido-2-methylpropane sulfonic acid and their salts, sulfoethyl (meth)acrylate and their salts, styrene sulfonic acid and its salt, hydroxyallyoxypropanesulfonic acid and its salt, 2-hydroxy-3-butenesulfonic acid and its salt, vinyl sulfonic acid and its salts, vinyl phosphonic acid and its salt).

Examples of other non-cyclic amines that can be reacted with the maleic anhydride polymer together with the cyclic amine include alkylamines or hydroxyamines with I to 5 carbon atoms. Examples of alkylamines are methylamine, dimethylamine, ethylamine, diethylamine, n-propylamine, iso-propylamine, iso-butylamine, n-butylamine, dimethylaminopropylamine, dimethylaminoethylamine. Examples of hydroxyamines include 2-amino-2-methyl-1-propanol, 2aminoethanol, 2-(2-aminoethylamino)ethanol, 2-(2-aminoethoxy)ethanol and 1-amino-2-propanol as well as polyglycols of ethylene oxide, propylene oxide and butylene oxide with one amine end group.

Polymer(s) B Containing the Structural Units (3)

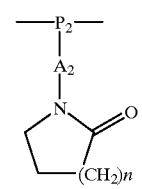

(3)

are preferably polymers made from one or more N-vinyl lactams. More preferably the N-vinyl lactams are chosen from N-vinyl pyrrolidone, N-vinyl piperidone and N-vinyl caprolactam.

Polymer B made from one or more N-vinyl lactam monomers can be homopolymers or structurally part of copolymers with other ethylenically unsaturated monomers including but not limited to alkenes with 2–24 carbons (including isobutylene, styrene, eicosene), (meth)acrylic acid and their salts, maleic anhydride, maleic acid, itaconic acid, crotonic acid and their salts or esters, alkyl (meth) acrylates with 3–26 carbons atoms (including methyl acrylate, n-butyl acrylate, isobutyl acrylate, stearyl acrylate, dimethylaminomethacrylate, methyl methacrylate, isobutyl methacrylate), hydroxyalkylacrylates (including hydroxypropylacrylate and hydroxyethylacrylate), vinyl carboxylates (including vinyl acetate), alkyl vinyl ethers (including isobutyl vinyl ether, isopropyl vinylether, methylvinylether, ethyl vinylether, propyl vinylether and butyl vinylether), N-vinyl lactams, (including N-vinyl caprolactam, N-vinyl piperidone or N-vinyl pyrrolidone), N-vinyl amides (including N-vinyl-N-methyl acetamide, N-vinyl acetamide and N-vinyl formamide), and other hydrophilic monomers (including vinyloxazolidone, isopropenyloxazoline, (meth) acrylamide, N-methyl(meth)acrylamide, N, N-dimethyl (meth)acrylamide, dimethylaminoethyl(meth)acrylate, N-ethylacrylamide and their salts, dimethylaminopropyl (meth)acrylamide and their salts, (meth)acrylamido-2-methylpropane sulfonic acid and their salts, sulfoethyl (meth)acrylate and their salts, styrene sulfonic acid and its salt, hydroxyallyoxypropanesulfonic acid and its salt, 2-hydroxy-3-butenesulfonic acid and its salt, vinyl sulfonic acid and its salts, vinyl phosphonic acid and its salt).

DETAILED DESCRIPTION OF THE INVENTION

The polymers used according to this invention are either available commercially or are readily synthesized by procedures known by those skilled in the art. The molecular weight for Polymer A of this invention must be in the range from 400 to 7000. Preferably the molecular weight for Polymer A is from 400 to 2,500. It is also necessary for Polymer A that its cloud point is greater than 50° C., preferably greater than 60° C. for 1 wt % solution in distilled water.

The amount of polymer A is generally between 0.05 and 5 wt %, preferably between 0.1 and 0.5 wt %, based on the amount of water in the hydrocarbon-containing mixture. The products can be added to a stream of light hydrocarbons and water, or to a drilling fluid, either as powders or preferably in concentrated solution.

Polymer(s) A of this invention can be used together with one or more of the following:

a vinyl lactam polymer a corrosion inhibitor. This additive is preferably added to an amount of between 0.01 and 0.5 wt. % based on the water content.

a material containing an alkylammonium quaternary group where at least one of the alkyl groups on the quaternary nitrogen atom has 4–5 carbon atoms. Examples include tetrabutylammonium salts and tetrapentylammonium salts and compounds and polymers containing the dipentyl-, dibutyl-, tripentyl- and tributyl ammonium quaternary group. These additives are also preferably added to an amount of between 0.01 and 0.5 wt % based on the water content.

a material containing an alkylamine oxide group where at least one of the alkyl groups on the nitrogen atom of the amine oxide has 4–5 carbon atoms. Examples include tributylamine oxide and tripentylamine oxide. These additives are also preferably added to an amount of between 0.01 and 0.5 wt. % based on the water content.

an alcohol, glycol, or alkanolamines. Examples include methanol, ethanol, isopropanol, 1-butanol, 2-butanol, butoxyethanol, 2-butoxypropan-2-ol, ethyleneglycol, diethyleneglycol, trietyleneglycol, and ethanolamine. This additive can also be a solvent and is preferably added to an amount of between 0.05 and wt % based on the water content.

The class of compound of this Invention can be formulated with a solvent s such as a water, a glycol or lower alcohol or a mixture of such solvents. Other production chemicals such as wax inhibitors, scale inhibitors and antifoam agents can be formulated with the said class of compound of this invention.

According to the invention we provide a method of controlling the formation, growth and/or agglomeration of clathrate hydrate. According to said method Polymer(s) A may be added to the fluid where said control is desired. Polymer(s) A may be added as a composition as described above, or two or more polymers selected from Polymer(s) A may be added separately so that the mixture is attained in said fluid. It is also possible to carry out the addition intermittently. Similarly, the use of Polymer(s) A may be performed by adding them as a composition or separately.

According to the invention we also provide, the unexpectedly highly effective method of controlling the formation, growth and/or agglomeration of clathrate hydrate by the use of the synergistic mixture of Polymer(s) A' and B which satisfies the following conditions.

Polymer x and Polymer y are materials which satisfy the following conditions (Polymer x being defined as the material whose In(WBF) is greater than that of the other one, which is Polymer y):

a) In(WFB) of x-In(WFB) of y is greater than 3, and
b) the Synergism Index, defined by the following equation, is greater than 0.05:

$$I_{(x,y)} = \frac{\{\ln(WBF_{(x)})/Dp_{(x)}^{0.5}\} \cdot Ph_{(x)} \cdot C_{(x)}^2}{\{\ln(WBF_{(y)})/Dp_{(y)}^{0.5}\} \cdot Ph_{(y)} \cdot C_{(y)}^2}$$

where I(x,y) is the parameter
Dp(I) is the degree of polymerization of the Polymer I
Ph(i) is the hydrophilicity factor of Polymer I defined by the following equation:

$$Ph = \frac{bp_{(H2O)at760mmHg}[K.]}{Tcloud[K.]}$$

where $bp_{(H2O)}$ is the boiling point of water in K
$T_{cloud}$ is the cloud point of a polymer whose molecular weight is over 10,000 in distilled water and structure is corresponding to either Polymers x or y.
$C_{(I)}$ is the concentration of the Polymer I,
where I is x or y c) preferably $I_{(x,y)}$ is greater than 0.1.

It is more preferable that the Polymer x satisfies the condition d) in addition to the conditions a) and b), and preferably also c).

d) In(WBF) of Polymer x is more preferably greater than −5.

The total amount of Polymers x and y that has to be added is generally between 0.05 and 5 wt. %, preferably between 0.1 and 0.5 wt. %, based on the amount of water in the hydrocarbon-containing mixture. The products can be added to a stream of light hydrocarbon and water, or to a drilling fluid, either as powder or preferably in concentrated solution.

Preferably the total amount of Polymer x added is greater than the amount of Polymer y. More preferably the amount of Polymer x is between 0.03 and 1% and the amount of Polymers y is between 0.01 and 0.5% based on the amount of water in the hydrocarbon containing mixture.

The mixture of compounds of this invention can be used together with one or more of the following:

a corrosion inhibitor. This additive is preferably added to an amount of between 0.01 and 0.5 wt. % based on the water content.

a material containing an alkylammonium quaternary group where at least one of the alkyl group on the quaternary nitrogen atom has 4–5 carbon atoms. Examples include tetrabutylammonium salts and tetrapentylammonium salts and compounds and polymers containing the dipentyl-, dibutyl-, tripentyl and tributyl ammonium quaternary group. These additives are also preferably added to an amount of between 0.01 and 0.5 wt. % based on water content.

a material containing an alkylamine oxide group where at least one of the alkyl group on the quaternary nitrogen atom has 4–5 carbon atoms. Examples include tributylamine oxide and tripentylamine oxide. These additives are also preferably added to an amount of between 0.01 and 0.5 wt. % based on water content.

an alcohol or glycol. Examples include isopropanol, 1-butanol, 2-butanol, butoxyethanol, and 2-butoxypropan-2-ol. This additives can also be a solvent and is preferably added to an amount of between 0.05 and 30 wt. % based on water content.

The class of compound of this invention can be formulated with a solvent such as water, a glycol or lower alcohol or a mixture of such solvents. Other drilling or production chemicals such as wax inhibitors, scale inhibitors and antifoam agents can be formulated with the said class of compound of this invention.

According to the invention we provide a method of controlling the formation, growth and/or agglomeration of clathrate hydrate. According to said method the Polymers x and y may be added to the fluid where said control is desired. Polymers x and y may be added as a composition as described above, or the two polymers may be added separately so that the mixture is obtained in said fluid. It is also possible to carry out the addition intermittently. Similarly, the use of Polymers x and y may be performed by adding them as a composition or separately.

EXAMPLES

Equipment and Test Procedure

To evaluate the performance of the hydrate inhibitor samples of this invention, the examples given herein use high pressure sapphire cells and methods of using them described in M. A. Kelland, T. M. Svartaas and L. A. Dybvik, Proc. SPE Annual Technical Conference/Production Operations and Engineering, 1994, pp 431–438. The sapphire cell high pressure test equipment is illustrated in FIG. 1.

The sapphire cell was mounted in a cooling bath. The sapphire cell consists of a sapphire tube enclosed in a holder between two stainless steel end pieces. The cell has an inner diameter of 20 mm, height 100 mm and a wall thickness of 20 mm. 15 mm of the top piece and 13 mm of the bottom piece protrudes into the cell, and the total volume between the top and bottom piece is 22.8 ml. The sapphire cell is equipped with a stirrer mechanism. A stirrer blade 2 is connected to a magnet house in the bottom end piece via an axle. An outer rotating magnetic field 3 created by a laboratory stirrer bar drive us used to regulate the stirrer speed. The stirrer motor can be regulated to maintain a constant speed (independent of motor load) in the range 0 to 1700 rpm. The regulator/amplifier unit has output connections for both torque and rotation speed readings. The stirrer speed readings are calibrated using a stroboscope. The sapphire cell is placed inside separate double-walled, transparent carbonate plastic cylinders with four separate windows at 0, 90, 180, 270° for visual observation. Temperature control of the cell is obtained by circulating water in the plastic cylinders and through a cooler/heater unit 8 connected to a temperature control unit 9. The cell system is equipped with two temperature sensors for the measurement of the temperature inside the cell 5 (in the gas phase) and in the water bath 6. Pressure is measured with a pressure transducer 7 through the inlet tubing connection in the top end piece of the cell. The temperature was measured to an accuracy of ±0.1° C. and the pressure was measured with an accuracy of ±0.2 bars. Video recordings of the experiments were also made. All data were assembled in a data logger 10. The data could be taken out on a printer/plotter 11. The same procedure for preparation of the experiment and fulling of the cell was followed in all experiments. All tests were performed on fresh synthetic sea water (SSW=3.6%) and synthetic natural gas (SNG). Oil or condensate was always added in experiments where the additive is designed to prevent agglomeration of hydrate particles. For experiments in which the additive is designed to prevent nucleation and crystal growth of hydrate, either SNG or SNG plus condensate was used. A description of the general test procedure is given here:

1) The chemical to be tested was dissolved or dispersed in Synthetic Sea Water (SSW) to the desired concentration. If the chemical was not easily solubilised or dispersed in the SSW it was added directly to the sapphire cell or as a concentrated solution or dispersion in another solvent.

2) The magnet housing of the cell was fulled with the aqueous solution containing the inhibitor to be tested. The magnet housing was then mounted in the bottom end piece of the cell, which thereafter was attached to the sapphire tube and the cell holder.

3) The desired amount of the aqueous solution was fulled in the cell (above the cell bottom) using a pipette, the top end piece was mounted, and the cell was placed into the cooling bath (plastic cylinder).

4) The temperature of the cooling bath was adjusted to 2–3 ° C. outside the hydrate region at the pressure conditions to be used in the experiment.

5) Prior to loading the cell with hydrocarbon gas or condensate it was purged two times with the SNG used in the experimental hydrocarbon fluid.

6) The data logging and video recording were started, and the cell was loaded with the hydrocarbon fluid to the desired pressure while stirring at 700 rpm. When the temperature and pressure in the cell had stabilized the experiment was started.

All nucleation/crystal growth experiments, called "Kinetic Inhibition" experiments, were conducted at constant temperature. Once the temperature and pressure had stabilized after loading of the cell the stirring was stopped. The closed cell was then cooled down to the experimental temperature, resulting in a decrease in pressure. When the temperature and pressure again had stabilized stirring at 700 rpm was started. The induction time, ti, for hydrate formation was measured from the time of start of stirring at the experimental temperature. The time from start of hydrate formation to the time when rapid growth of hydrate ensues is called the crystal growth delay time, St-1. The results of all experiments were recorded by plotting temperature, pressure (or the Total Gas Consumption TGC) and torque as a function of time.

Kinetic Inhibition Experiments

All examples in Tables 1–3 were all carried out between 89–91 bar pressure but at various constant temperatures, except two experiments with an asterisk* which were carried out at 200 bar. As expected, the lower the temperature the smaller the induction time (ti) and growth delay (St-1) for hydrate formation. Tcl is the cloud point in distilled water of a ca. 1% solution of the sample. The concentrations of Samples A, B and C in Tables 1–3 refer to active concentrations.

In Tables 1–2, a condensate/SNG/brine is used. For these experiments an experimental temperature of 4.0° C. is equivalent to a subcooling of 14.7° C. In Table 3 an SNG/brine mixture is used. For these experiments an experimental temperature of 4.0° C. is equivalent to a subcooling of ca. 16° C.

The sample codes in the Tables 1–5 refer to the following materials (where ratios of monomers are molar ratios):
Samples with the prefix AP-1000 or APW-1000 are polyacryloylpyrrolidine homopolymers.
Samples with the prefix PVCap are polyvinylcaprolactam homopolymers. PVCap 19k Mw 20,000 is a 40% solution in ethanol. Otherwise the PVCap samples are solids. PVCap 1 has Mw>200000.
Gaffix VC713 is a terpolymer of N-vinylcaprolactam, N-vinyl pyrrolidone and dimethylaminoethylmethacrylate from International Specialty Products, Mw 63000.
10305–100 is a terpolymer of N-vinylcaprolactam, N-vinyl pyrrolidone and dimethylaminoethylmethacrylate of Mw 19,000 from International Specialty Products.
VIMA:VCap is a 1:1 molar ratio copolymer of N-vinylcaprolactam and N-methyl-N-vinyl acetamide of Mn ca. 2,000 and Tcl 60° C.
VP:VCap is a 1:1 molar ratio copolymer of N-vinylcaprolactam and N-vinyl pyrrolidine of Mn/Mw 1,700/4,800.
VP:VCap(97) is 1:1 molar ratio copolymer of N-vinylcaprolactam and N-vinyl pyrrolidine of Mn/Mw 1,35012,650.
VP:VCap 1:1 (Tcl 93° C.) is 1:1 molar ratio copolymer of N-vinylcaprolactam and N-vinyl pyrrolidine of Mw ca. 15,000.
VCap/VP=½ (Mn/Mw 250/580) in EtOH and VCapNP 4/1 (Mw 42,000) in E-tOH are copolymers of N-vinylcaprolactam and N-vinyl pyrrolidine in ratios 1:2 and 4:1 respectively as ca. 20% solutions in ethanol.
AP:VCap 2:1 is a copolymer of acryloylpyrrolidine and N-vinyl caprolactam in 2:1 molar ratio.
AP:VP 9:1 and AP:VP 7:3 are copolymers of acryloylpyrrolidine and N-vinyl pyrrolidone in 9:1 and 7:3 molar ratios with Mn ca. 20,000.
APAM-1050-09 and APAM-1070-09 are 1:1 and 7:3 copolymers of acryloylpyrrolidine and acrylamide.
PVP 15k is polyvinylpyrrolidone of Mw 15,000 from BASF.
PVIMA is poly-N-methyl-N-vinyl acetamide of Mw>20,000.
TBAB is tetrabutylammonium bromide commercially available from Fluka.
TBAO is tributylamine oxide
CX-WS-150 is polyvinyloxazoline of Mw ca. 30,000.
IP-1000 and IP-1000-11 are polyisopropylacrylamide homopolymers.

Samples with the prefix IP-10XXAS are copolymers of isopropylacrylamide and acrylamido-2-methylpropanesulfonic acid (AMPS). XX refers to the percentage AMPS in the copolymer, e.g. IP-1020AS is a copolymer of isopropylacrylamide and acrylamido-2-methylpropanesulfonic acid (AMPS) in 8:2 molar ratio. The letter N in the suffix means the polymer has been neutralised.

Samples with the prefix IP-10XXDA are copolymers of isopropylacrylamide and dimethylaminoethylacrylate. XX refers to the percentage dimethylaminoethylacrylate in the copolymer. e.g. IP1020DA-16 is a copolymer of isopropylacrylamide and dimethylaminoethylacrylate in 8:2 molar ratio.

IP-10XXDAQ are the neutralised versions of IP-10XXDA.

IP-1020AA-11 is a 8:2 copolymer of isopropylacrylamide and acrylic acid.

IP-1020AAN-11 is a neutralised (NaOH) version of IP-1020AA-11.

IP-1010VP-97 and IP1010VP-11 are 9:1 copolymers of isopropylacrylamide and vinyl pyrrolidine.

IP1050VI-12 is a 1:1 copolymer of isopropylacrylamide and N-methyl-N-vinyl acetamide.

IP1020DPAQ-13 and IP1030DPAQ-15 are 8:2 and 7:3 neutralised copolymers respectively of isopropylacrylamide and dimethylaminopropylacrylamide.

GP-1000 is polyglyoxyloylpyrrolidine homopolymer.

AS-1000 is pyrrolidinocarbonyl aspartate homopolymer.

The materials are either commercially available, as indicated, or were prepared by standard free radical polymerization procedures familiar to those skilled in the art, or by the methods described herein.

Table 1 (Experiments 1–51)

In Table 1, experiments 6–7, 9–16, 20–21, 23, 25–33. 36, 38–43, 45 and 48–51 are within the scope of the invention. The experiments illustrate the use of Polymer(s) A with Tcl values over 50° C. (ca. 1% solutions in H2O) and Mn values within the range 400–7,000, as single component systems for inhibiting a hydrate forming system.

Experiments 6–21 illustrate the varying effect of molecular weight on the performance of Polymer(s) A based on acryloylpyrrolidine. In particular, experiment 8 illustrates the poorer performance of polymers with high molecular weight (Mn>7,000), and experiment 17 illustrates the poor performance at too Is low molecular weight (Mn<400).

Both the series of experiments 6–21 with Polymer(s) A containing the acryloylpyrrolidine monomer unit and the series of experiments 22–50 carried out with a variety of Polymer(s) A containing the isopropylacrylamide monomer unit illustrate that high hydrate inhibition performance can be obtained with polymers with high cloud points (i.e. >50° C. as ca. 1% solutions in H2O).

Experiment 51 illustrates that use of a high Tcl, low molecular weight Polymer A with heteroatom backbone for inhibiting a hydrate forming system.

TABLE 1

SNG/Condensate/brine.

| Expt. | Sample A | Concn/ppm | T cl/° C. | Mn | Sample B (1000 ppm) | Sample C (1000 ppm) | T/° C. | ti/mins | St – 1/mins | Total |
|---|---|---|---|---|---|---|---|---|---|---|
| 1 | none | | | | | | 7.6 | <2 | <2 | 0 |
| 2 | PVCap3 | 5000 | 31 | 7,500 | | | 7.6 | 49 | 70 | 119 |
| 3 | Gaffix VC713 | 5000 | 31 | 4500 | | | 5.8 | 28 | 32 | 60 |
| 4 | Gaffix VC713 | 5000 | 31 | 4500 | | | 3.9 | 3.9 | 0.6 | 3.9 |
| 5 | VIMA:VCap | 5000 | 60 | ca. 2000 | | | 3.9 | 1.3 | 4.5 | 5.8 |
| 6 | AP-1000L | 5000 | 60 | 1,200 | | | 5.7 | 33 | 148 | 181 |
| 7 | AP-1000L | 5000 | 60 | 1,200 | | | 3.7 | 2 | 22 | 24 |
| 8 | AP-1000 270K | 6000 | 43 | 43,000 | | | 5.5 | 14 | 3 | 17 |
| 9 | AP-1000 ACM | 5000 | >95 | 6,100 | | | 5.5 | 620 | 180 | 800 |
| 10 | AP-1000 ACL | 5000 | >95 | 2,100 | | | 5.5 | 250 | 250 | 500 |
| 11 | AP-1000 ACM | 5000 | >95 | 6,100 | | | 3.9 | 158 | 73 | 231 |
| 12 | AP-1000 ACL | 5000 | >95 | 2,100 | | | 3.9 | 402 | 30 | 432 |
| 13 | AP-1000 ACB21 | 5000 | 78 | 2,100 | | | 3.9 | 105 | 85 | 190 |
| 14 | APW-1000L | 5000 | 77 | 400 | | | 3.9 | 95 | 180 | 275 |
| 15 | AP-1000 ACB 2 | 5000 | 78 | 2,100 | | | 2.7 | 40 | 78 | 118 |
| 16 | AP-1000ACB9 | 5000 | >95 | 870 | | | 2.7 | 74 | 26 | 100 |
| 17 | AP-1000ACB3 | 5000 | >95 | 300 | | | 2.7 | 0 | 7 | 7 |
| 18 | AP:VP 9:1 | 5000 | 50 | 22,000 | | | 5.7 | 0 | 15.5 | 15.5 |
| 19 | AP:VP 7:3 | 5000 | 57 | 20,000 | | | 5.7 | 0 | 3 | 3 |
| 20 | APAM-1050-09 | 5000 | >95 | 900 | | | 3.7 | 65 | 75 | 140 |
| 21 | APAM-1070-09 | 5000 | >95 | 900 | | | 3.7 | 23 | 18 | 41 |
| 22 | IP-1000-11 | 5000 | 42 | 1,100 | | | 3.9 | 66 | 64 | 130 |
| 23 | IP-1000 | 5000 | 63 | 580 | | | 3.9 | 32 | 30 | 62 |
| 24 | IP1000-11 | 5000 | 42 | 1,100 | | | 2.7 | 20 | 63 | 83 |
| 26 | IP1010ASN-26 | 5000 | 76 | 2,600 | | | 3.6 | 108 | 62 | 170 |
| 27 | IP1010AS-11 | 5000 | 58 | 1,100 | | | 2.7 | 300 | 42 | 342 |
| 28 | IP-1010ASN-11 | 5000 | 60 | 1,100 | | | 2.7 | 325 | 38 | 363 |
| 29 | IP-1010ASN-26 | 5000 | 76 | 2,600 | | | 2.7 | 50 | 62 | 112 |
| 30 | IP-1010AS-22 | 5000 | 51 | 2,200 | | | 2.7 | 68 | 74 | 142 |
| 31 | IP-1020AS-5 | 5000 | >95 | 540 | | | 2.7 | 26 | 3 | 29 |
| 32 | IP-1020ASN-11 | 5000 | >95 | 1,100 | | | 2.7 | 46 | 10 | 56 |
| 33 | IP-1030ASN-13 | 5000 | >95 | 1,300 | | | 2.7 | 29 | 8 | 37 |
| 34 | IP-1010DA-12 | 5000 | 43 | 1,200 | | | 3.6 | 60 | 50 | 110 |
| 35 | IP-1020DA-16 | 5000 | 40 | 1,600 | | | 3.6 | 62 | 67 | 129 |
| 36 | IP-1020DAQ-16 | 5000 | 62 | 1,600 | | | 3.6 | 45 | 88 | 133 |
| 37 | IP1010DA-12 | 5000 | 43 | 1,200 | | | 2.7 | 87 | 54 | 141 |
| 38 | IP-1020DAQ-16 | 5000 | 62 | 1,600 | | | 2.7 | 64.5 | 25 | 89.5 |
| 39 | IP-1035DAQ-16 | 5000 | >95 | 1,500 | | | 2.7 | 35 | 12 | 47 |
| 40 | IP-1045DA-9 | 5000 | >95 | 900 | | | 2.7 | 19 | 7 | 26 |
| 41 | IP-1045DA-9 | 7500 | >95 | 900 | | | 2.7 | 24 | 22 | 46 |
| 42 | IP-1045DA-9 | 10000 | >95 | 900 | | | 2.7 | 20 | 42 | 62 |
| 43 | IP-1010AA | 5000 | >95 | 1,800 | | | 3.6 | 58 | 72 | 130 |
| 44 | IP-1020AA-11 | 5000 | 37 | 1,100 | | | 3.6 | 45 | 70 | 115 |
| 45 | IP-1020AAN-11 | 5000 | >95 | 1,100 | | | 3.6 | 58 | 32 | 90 |
| 46 | IP-1010VP-97 | 5000 | 37 | 9,700 | | | 3.6 | 24 | 41 | 65 |
| 47 | IP-1010VP-11 | 5000 | 43 | 1,000 | | | 3.6 | 65 | 85 | 150 |
| 48 | IP1050VI-12 | 5000 | 91 | 1,100 | | | 3.6 | 20 | 43 | 63 |
| 49 | IP1020DPAQ-13 | 5000 | >95 | 1,300 | | | 2.7 | 69 | 15 | 84 |
| 50 | IP1030DPAQ-15 | 5000 | >95 | 1,500 | | | 2.7 | 29 | 7.5 | 36.5 |
| 51 | GP-1000 | 5000 | >95 | 4,300 | | | 5.4 | 909 | 28 | 937 |

Table 2 (Experiments 52–104)

The experiments in Table 2 were carried in an identical manner to those in Table 1. These experiments illustrate the use of a blend of a Polymer A' together with one or two Polymer(s) B. The use of optional additives in these blends such as certain alkylammonium salts, amine oxide and alcohols is also illustrated Thus, experiments 54–62, 67–99, and 100–105 are also within the scope of the invention. Experiment 52 is within the scope of the invention referring to low molecular weight high Tcl single component Polymer A. In Table 2 it is used at 6000 ppm and given as a comparison.

Experiments 54–62, 68, 70–73 and 85 indicate that addition of small amounts of a Polymer B, examples containing the N-vinyl caprolactam monomer or N-vinyl pyrrolidone monomer, to a larger amount of a Polymer A, an acryloylpyrrolidine polymer, gave a significant increase in gas hydrate inhibition performance, much greater than using the same total amount of a acryloylpyrrolidine polymer. Surprisingly, addition of a small amounts of polymers containing the acryloylpyrrolidine monomer to a larger amount of a N-vinyl lactam polymer did not give as significant an increase in gas hydrate inhibition performance as illustrated in experiments 63–66.

Experiments 72–73 illustrate the use of one of the claimed optional additives, in this case tetrabutylammonium bromide (TBAB), in a blend of Polymer(s) A and B to increase the performance of a mixture of Polymer(s) A' and B according to the invention.

A similar significant increase in gas hydrate inhibition performance is seen by adding small amounts of a Polymer B, examples containing the N-vinyl caprolactam monomer or N-vinyl pyrrolidone monomer, to a larger amount of other Polymer(s) A, isopropylacrylamide polymers (experiments 91 and 93–99), polyglyoxyloylpyrrolidine polymers (experiments 100–101) and pyrrolidinocarbonyl aspartate polymers (experiments 103–104).

Further, experiments 74–84 indicate that addition of a mixture of Polymer(s) B, one containing the N-vinyl caprolactam monomer and one containing the N-vinyl pyrrolidone monomer, to larger amounts of a acryloylpyrrolidine polymer (Polymer A' type) gave a significant increase in gas hydrate inhibition performance, much greater than using the same total amount of the acryloylpyrrolidine polymer. The same effect with other Polymer(s) A is illustrated for isopropylacrylamide polymers (experiments 86–90 and 92), polyglyoxyloylpyrrolidine polymers (experiment 102) and pyrrolidinocarbonyl aspartate polymers (experiment 105).

Further, a comparison of experiments 54, 68 and 70–71 indicates that addition of polymers containing the N-vinyl caprolactam monomer or N-vinyl pyrrolidone monomer to a larger amount of a acryloylpyrrolidine polymer gives best performance when the molecular weight of the acryloylpyrrolidine polymer is low. This is in accord with the theory explained in this invention.

Experiments 18–19 (from Table 1) and 114 (from Table 3) indicate that a copolymer formed by copolymerising acryloylpyrrolidine monomer [with structure unit (1')] and a N-vinyl lactam monomer [with structure unit (3)] gives a worse hydrate inhibitor than using a similar weight of a mixture of a polymer acryloylpyrrolidine and a N-vinyl lactam polymer.

In addition, experiments 58–59 indicate that there is an improved inhibition in adding a Polymer B made from both vinyl caprolactam and vinyl pyrrolidone monomers to a larger amount of a acryloylpyrrolidine Polymer A'.

TABLE 2

| Expt. | Sample A | Concn/ppm | T cl/° C. | Mn | Sample B (1000 ppm) | Sample C (1000 ppm) | T/° C. | ti/mins | St − 1/mins | Total |
|---|---|---|---|---|---|---|---|---|---|---|
| 52 | AP-1000L | 5000 | 60 | 1,200 | AP-1000L | | 5.7 | 250 | 120 | 370 |
| 53 | AP-1000 270k | 5000 | 43 | 43,000 | AP-1000 270k | | 5.7 | 14 | 3.2 | 17.2 |
| 54 | AP-1000L | 5000 | 60 | 1,200 | PVCap1 | | 5.7 | 840 | 150 | 990 |
| 55 | AP-1000L | 5000 | 60 | 1,200 | PVCap2 | | 4.0 | 682 | 211 | 893 |
| 56 | AP-1000L | 5000 | 60 | 1,200 | PVCap3 | | 5.7 | >1347 | | >1347 |
| 57 | AP-1000L | 5000 | 60 | 1,200 | PVCap3 | | 3.9 | 110 | 170 | 280 |
| 58 | AP-1000L | 5000 | 60 | 1,200 | VP:VCap | | 5.7 | >1161 | | >1161 |
| 59 | AP-1000L | 5000 | 60 | 1,200 | VP:VCap | | 3.9 | 843 | 68 | 911 |
| 60 | AP-1000L | 5000 | 60 | 1,200 | VIMA:VCap | | 3.9 | 93 | 77 | 170 |
| 61 | AP-1000L | 5000 | 60 | 1,200 | Gaffix VC713 | | 3.7 | 5 | 160 | 165 |
| 62 | AP-1000L | 5000 | 60 | 1,200 | 10305-100 | | 5.6 | 845 | 146 | 991 |
| 63 | Gaffix VC 713 | 5000 | 31 | 4500 | AP-1000L | | 3.7 | 0.5 | 21 | 21 |
| 64 | PVCap1 | 5000 | 31 | >20,000 | AP-1000L | | 5.7 | 173 | 327 | 500 |
| 65 | PVCap2 | 5000 | 31 | 1,500 | AP-1000L | | 3.7 | 60 | 1.3 | 61.3 |
| 66 | PVCap3 | 5000 | 31 | 7,500 | AP-1000L | | 3.7 | 6.5 | 0.8 | 7.3 |
| 67 | AP-1000L | 5000 | 60 | 1,200 | PVIMA | | 5.7 | 60 | 159 | 219 |
| 68 | AP-1000L | 5000 | 60 | 1,200 | PVP 15k | | 5.7 | 705 | 130 | 835 |
| 69 | AP-1000L | 5000 | 60 | 1,200 | CX-WS-150 | | 5.7 | 130 | 30 | 160 |
| 70 | AP-1000 270k | 5000 | 43 | 43,000 | PVP 15k | | 5.7 | 135 | 195 | 330 |
| 71 | AP-1000 270k | 5000 | 43 | 43,000 | PVCap1 | | 5.7 | 593 | 43 | 636 |
| 72 | AP-1000L | 4000 | 60 | 1,200 | VP:VCap | TBAB | 5.4 | 1025 | 1181 | 2206 |
| 73 | AP-1000L | 4000 | 60 | 1,200 | VP:VCap | TBAB | 3.9 | 34 | 386 | 420 |
| 74 | AP-1000L | 4000 | 60 | 1,200 | PVCap1 | PVP 15k | 3.9 | 765 | 133 | 898 |
| 75 | AP-1000B | 4000 | >95 | 270 | PVP 15k | PVCap 19k | 2.7 | 267 | 56 | 323 |
| 79 | AP-1000 ACL | 4000 | >95 | 2,100 | PVP 15k | PVCap 19k | 2.7 | 130 | 90 | 220 |
| 80 | AP-1000ACB9 | 4000 | >95 | 870 | PVP 15k | PVCap 19k | 2.7 | 90 | 140 | 230 |
| 81 | AP-1000ACB9 | 4000 | >95 | 870 | Antaron P904 | PVCap 19k | 2.7 | 440 | 50 | 490 |
| 82 | AP-1000ACB21 | 4000 | 78 | 2,100 | PVP 15k | PVCap 19k | 2.7 | 137 | 73 | 210 |
| 83 | AP-1000ACB21 | 4000 | 78 | 2,100 | Antaron P904 | PVCap 19k | 2.7 | 310 | 160 | 470 |
| 84 | AP-1000B * | 4000 | >95 | 270 | Antaron P904 | PVCap 19k | 7.5 | 85 | 576 | 661 |
| 85 | APW-1000L * | 5000 | 77 | 400 | PVCap 19k | | 7.5 | 197 | 20 | 217 |
| 86 | IP-1000-11 | 4000 | 42 | 1,100 | Antaron P904 | PVCap 19k | 2.7 | 126 | 186 | 312 |
| 87 | IP-1000-11 | 4000 | 42 | 1,100 | Antaron P904 | PVCap 19k | 2.7 | 250 | 115 | 365 |
| 88 | IP-1000-11 | 4000 | 42 | 1,100 | Antaron P904 | PVCap 19k | 2.7 | 115 | 365 | 480 |
| 89 | IP-1010DA-12 | 4000 | 43 | 1,200 | Antaron P904 | PVCap 19k | 2.7 | 330 | 160 | 490 |
| 90 | IP-1000-11 | 4000 | 42 | 1,100 | Antaron P904 | PVCap 19k | 3.7 | 300 | 147 | 447 |
| 91 | IP-1010DA-12 | 5000 | 43 | 1,200 | PVCap 19k | | 3.7 | 600 | 90 | 690 |
| 92 | IP-1010DA-12 | 4000 | 43 | 1,200 | Antaron P904 | PVCap 19k | 3.7 | 593 | 60 | 653 |
| 93 | IP-1020DA-16 | 5000 | 40 | 1,600 | PVP 15k | | 3.7 | 565 | 128 | 693 |
| 94 | IP-1020DAQ-16 | 5000 | 62 | 1,600 | VCap/VP = 1/2 in EtOH | | 3.6 | >1143 | | >1143 |
| 95 | IP-1020DAQ-16 | 5000 | 62 | 1,600 | VCap/VP = 4/1 in EtOH | | 3.7 | >1113 | | >1113 |
| 96 | IP-1020DAQ-16 | 5000 | 62 | 1,600 | VP:VCap 1:1 (T cl 93° C.) | | 3.5 | 170 | 49 | 219 |
| 97 | IP1010AS-26 | 5000 | 62 | 2,600 | PVP 15k | | 3.7 | 170 | 127 | 297 |
| 98 | IP1010AS-26 | 5000 | 62 | 2,600 | VP/VCap = 1/1 | | 3.7 | 123 | 122 | 245 |
| 99 | IP1010AS-26 | 5000 | 62 | 2,600 | PVCap 19k | | 3.6 | >1066 | | >1066 |
| 100 | GP-1000 | 5000 | >95 | 4,300 | PVCap 19k | | 2.7 | 171 | 0 | 171 |
| 101 | GP-1000 | 5000 | >95 | 4,300 | PVP 15k | | 5.4 | 2115 | 255 | 2370 |
| 102 | GP-1000 | 4000 | >95 | 4,300 | PVP 15k | PVCap 19k | 5.4 | >2700 | | >2700 |
| 103 | AS-1000 | 5000 | >95 | 8400 | PVCap 19k | | 5.4 | >1203 | | 1203 |
| 104 | AS-1000 | 4000 | >95 | 8400 | PVP 15k | PVCap 19k | 5.4 | >5310 | | >5310 |

Table 3 (Experiments 105–113)

The experiments in Table 3 were carried in an identical manner to those in Tables 1 and 2 except that a natural gas mixture was used without added condensate. Concentrations of polymer are given in brackets after the polymer code. Table 3, experiments 106, 107 and 110–112 are within the scope of the invention.

TABLE 3

Experiments with SNG/brine.

| Expt. | Polymer A | Concentration ppm | T cl/° C. | Polymer B Mn | (concentration/ppm) | Polymer C (1000 ppm) | T/° C. | ti/mins | St – 1/mins | Total |
|---|---|---|---|---|---|---|---|---|---|---|
| 105 | None | | | | | | 7.6 | <2 | <2 | <4 |
| 106 | AP-1000L | 5000 | 60 | 1,200 | | | 7.4 | 2 | 305 | 307 |
| 107 | AP-1000L | 5000 | 60 | 1,200 | | | 5.4 | 27 | 140 | 167 |
| 108 | Gaffix VC713 | 5000 | 31 | 4500 | | | 7.4 | 18 | 246 | 264 |
| 109 | Gaffix VC713 | 5000 | 31 | 4500 | | | 5.4 | 4.5 | 60 | 64.5 |
| 110 | AP-1000 10k | 5000 | 65 | 3700 | TBAO (500) | | 5.4 | 46 | 183 | 229 |
| 111 | AP-1000 10k | 5000 | 65 | 3700 | TBAB (1000) | | 5.4 | 49 | 300 | 349 |
| 112 | AP-1000 10k | 2500 | 65 | 3700 | Gaffix VC713 (2500) | | 7.4 | 155 | 499 | 654 |
| 113 | AP:VCap 2:1 | 5000 | 60 | 7,100 | | | 5.5 | 36 | 138 | 174 |

Molecular Modelling and Synergism Index Calculations

Monte Carlo simulations were performed using the SORPTION module of Cerius2 (MSI Inc.) to examine the adsorption of materials onto various surfaces of a type II hydrate. WBF, the weighted Boltzmann factor, which is a probability and is a sum over all grid cells on the surface, was determined for various materials. Thus, ln(WBF) is related to the free energy of adsorption. Table 4 lists relevant examples of calculated ln(WBF) values.

TABLE 4

| Polymer | ln(WBF) | Mw |
|---|---|---|
| AP-1000 L | −1.55 | 5000 |
| AP-1000 10K | −1.55 | 10000 |
| AP-1000 270K | −1.55 | 270000 |
| PVP 15k | −6.48 | 15000 |
| PVCap1 | −9.72 | >200000 |
| Gaffix VC 713* | −8.75 | 63000 |

*ln(WBF) of Gaffix VC 713 was calculated assuming it is a polymer of VP:VCap 3:7 molar ratio. The contribution of the dimethylaminoethylacrylate monomer on ln(WBF) is negligible, and the additivity rule is applicable on ln(WBF).

Since ln(WBF) is related to the affinity and adsorption energy of a material, it is understood that a material having a higher ln(WBF) adsorbs more strongly and more stable than one having lower ln(WBF) when other conditions are the same.

Determination of the Synergism Index, I(x,y), and comparison with experimental results given earlier, is given in Table 5.

TABLE 5

| Polymer x (5000 ppm) | Polymer y (1000 ppm) | ln[WBF(x)] – ln[WBF(y)] | I(x,y) | ti/mins | St – 1/mins |
|---|---|---|---|---|---|
| AP-1000 L | PVP | 4.93 | 49.22 | 705 | 130 |
| AP-1000 L | PVCap1 | 8.17 | 26.92 | 840 | 150 |
| AP-1000 | PVP | 4.93 | 13.50 | 135 | 195 |
| 270K | | | | | |
| AP-1000 | PVCap1 | 8.17 | 7.22 | 593 | 43 |
| 270K | | | | | |
| AP-1000 L | Gaffix VC 713 | 7.20 | 48.27 | 5 | 160 |
| (1000 ppm) | (5000 ppm) | | | | |
| AP-1000 L | Gaffix VC 713 | 7.20 | 0.0031 | 0.5 | 21 |

What is claimed is:

1. A polymer composition useful for controlling the formation, growth and/or agglomeration of clathrate hydrate comprising two different polymers, designated Polymer x and Polymer y respectively, characterized in that Polymer x is a material whose ln(WBF) is greater than that of Polymer y, which satisfy the following conditions: a) ln(WBF) of x−ln(WBF) of y is greater than 3 and b) the Synergism Index, defined by the following equation, is greater than 0.05:

$$I_{(x,y)} = \frac{\{\ln(WBF_{(x)})/Dp_{(x)}^{0.5}\} \cdot Ph_{(x)} \cdot C_{(x)}^2}{\{\ln(WBF_{(y)})/Dp_{(y)}^{0.5}\} \cdot Ph_{(y)} \cdot C_{(y)}^2}$$

where $I_{(x,y)}$ is the parameter $Dp_{(i)}$ is the degree of polymerization of the Polymer I $Ph_{(i)}$ is the hydrophilicity factor of the Polymer i defined by the following equation:

$$Ph = \frac{bp_{(H2O)\,at\,760mmHg}[K.]}{Tcloud[K.]}$$

where $bp_{(H2O)}$ is the boiling point of water in K $T_{cloud}$ is the cloud point in 1 wt % solution in distilled water of a polymer of a structure corresponding to either Polymer x or y when its molecular weight is over 10,000

C(i) is the concentration of the Polymer i, where i is x or y.

2. The composition of claim 1, characterized in that $I_{(x,y)}$ is greater than 0.1.

3. The composition of claim 1, characterized in that ln(WBF) of Polymer x is above −5.

4. The composition of claim 1, characterized in that the molecular weight of Polymer B is from 1,000–500,000.

5. The use of composition as defined in claim 1, either as a mixture or separately for controlling the formation, growth and/or agglomeration of clathrate hydrate.

6. The composition of claim 1, characterized in that the composition contains alcohols and/or glycols in an amount of between 0.5 to 100 wt. part to 1 wt. part of the polymer content of the composition.

7. The composition of claim 6, characterized in that the composition contains one or more of alcohols and/or glycols selected from methanol, ethanol, isopropanol, butanol, 2-butoxy ethanol, 2-propoxy ethanol, ethylene glycol and propylene glycol.

* * * * *